United States Patent
Khalighi et al.

(10) Patent No.: US 7,055,638 B2
(45) Date of Patent: Jun. 6, 2006

(54) VIRTUAL AIRDAM AND METHOD FOR A VEHICLE

(75) Inventors: Bahram Khalighi, Troy, MI (US); Sanjay Kumarasamy, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/763,663

(22) Filed: Jan. 23, 2004

(65) Prior Publication Data

US 2005/0161269 A1 Jul. 28, 2005

(51) Int. Cl.
*B60V 1/00* (2006.01)

(52) U.S. Cl. .................................... 180/116; 296/180.1
(58) Field of Classification Search ...... 180/68.1–68.2, 180/123
See application file for complete search history.

(56) References Cited

U.S. PATENT DOCUMENTS

| | | | | |
|---|---|---|---|---|
| 2,037,942 A * | 4/1936 | Stalker | ...... | 180/89.1 |
| 2,886,120 A * | 5/1959 | Broell | ...... | 180/68.1 |
| 3,322,223 A * | 5/1967 | Bertelsen | ...... | 180/120 |
| 3,786,893 A * | 1/1974 | Joyce et al. | ...... | 180/119 |
| 3,952,823 A | 4/1976 | Hinderks | ...... | 180/64 |
| 4,102,548 A * | 7/1978 | Kangas | ...... | 296/180.3 |
| 4,673,206 A * | 6/1987 | Kretschmer et al. | ...... | 296/180.1 |
| 4,723,594 A * | 2/1988 | Koehr et al. | ...... | 165/44 |
| 4,810,022 A | 3/1989 | Takagi et al. | ...... | 296/180.5 |
| 5,074,592 A * | 12/1991 | White | ...... | 280/851 |
| 5,141,173 A * | 8/1992 | Lay | ...... | 244/2 |
| 5,301,996 A * | 4/1994 | Theis | ...... | 296/180.1 |
| 5,407,245 A | 4/1995 | Geropp | ...... | 296/180.1 |
| 5,419,608 A * | 5/1995 | Takemoto | ...... | 296/180.1 |
| 5,505,407 A * | 4/1996 | Chiappetta | ...... | 244/2 |
| 5,526,872 A * | 6/1996 | Gielda et al. | ...... | 165/41 |
| 5,555,594 A * | 9/1996 | Maddalena | ...... | 15/313 |
| 5,626,185 A * | 5/1997 | Gielda et al. | ...... | 165/41 |
| 5,820,203 A * | 10/1998 | Morelli et al. | ...... | 296/180.1 |
| 5,860,620 A * | 1/1999 | Wainfan et al. | ...... | 244/12.1 |
| 5,863,090 A * | 1/1999 | Englar | ...... | 296/180.1 |
| 5,908,217 A | 6/1999 | Englar | ...... | 296/180.1 |
| 6,223,843 B1 * | 5/2001 | O'Connell et al. | ...... | 180/65.3 |
| 6,224,843 B1 * | 5/2001 | Ahmed et al. | ...... | 423/437.1 |
| 6,230,836 B1 * | 5/2001 | Cowan et al. | ...... | 180/118 |
| 6,464,459 B1 * | 10/2002 | Illingworth | ...... | 415/208.2 |
| 2005/0029027 A1* | 2/2005 | Kunikata et al. | ...... | 180/68.1 |

* cited by examiner

*Primary Examiner*—Tony Winner
(74) *Attorney, Agent, or Firm*—Kathryn A. Marra; Quinn Law Group PLLC

(57) ABSTRACT

An air curtain (jet flow) replaces the conventional air-diverting baffle on the underside of a vehicle's front engine compartment to reduce drag and increase volumetric air flow for cooling.

15 Claims, 3 Drawing Sheets

VIRTUAL AIRDAM AND METHOD FOR A VEHICLE

TECHNICAL FIELD

This invention relates to a vehicle air curtain which can be activated based on road conditions.

BACKGROUND OF THE INVENTION

The function of an airdam (also referred as a front spoiler) is to reduce the total drag, and to increase volumetric flow of cooling air in a vehicle's engine compartment. As an add-on part, the airdam (usually made of plastic) is placed under the front of the vehicle at nearly a right angle to the flow. The drag reducing effect of an airdam is based on the fact that it diminishes the air speed under a vehicle thus attenuating the contribution of the underbody airflow to the overall drag. This is important since fuel economy is affected by drag. The height of the airdam must be experimentally adjusted for each vehicle model. In most cases the optimum height can not be achieved due to the ground clearance limitations and other road factors (curbside, etc.). It is possible to damage the airdam while driving or parking due to its low clearance. In most cases a damaged airdam must be replaced with a new one.

The prior art includes mechanical aerodynamic control devices. While these prior approaches may reduce drag to some effect, each of the approaches is limited in its effectiveness or desirability. For instance, mechanical aerodynamic control devices add weight and undue complexity to the vehicle. Further, since mechanical controls usually cause drag at off-design conditions, e.g., lower or higher speeds, the mechanical controls desirably must be mechanically adjustable, which further adds to the weight and complexity. And airdams which hang too low hit parking curbs.

SUMMARY OF THE INVENTION

This invention proposes to replace the plastic airdam with a virtual airdam comprising a jet of air at the same location. The proposed invention uses a virtual airdam which is generated by blowing air generally vertically downwardly under the vehicle as a jet flow. To generate this jet flow, forced air is blown through a conduit and ejected downward through a series of ports or openings or an elongated slit in the conduit to perform at least some of the functions of a conventional airdam. If the opening is a slit, the opening has a width of about 1 cm and its length is the same as the conventional airdam. There is an air actuating system that can be activated whenever the function of an air curtain (jet flow) is required to replace a conventional airdam. The actuating system may operate to change the angle and the velocity of the air jet. The goal is to maintain the same cooling for the engine component while improving drag reduction. This includes both the high speed drag reduction and the low speed cooling requirements of the vehicle. Drag reduction is a function of the jet or blowing velocity. The optimum set speed ratio is around 1.5.

This invention includes a vehicle having a forward end spaced from a support surface for the vehicle. The forward end has a source of air under pressure and a conduit spaced sufficiently from any normal abutment on said support surface to avoid said abutment and operable to project a curtain of air from the forward end toward the support surface with sufficient flow and location to form a virtual airdam sufficient to reduce drag without impairing the internal combustion (IC) engine cooling requirements of the vehicle.

Fuel cell vehicles under development have much higher cooling airflow requirements (almost three times the conventional ones or internal combustion engines (IC)). Cooling flow in IC vehicles is used for engine cooling and is also later used to cool some hot spots in the underhood environment. Fuel cell vehicles as envisaged do not have the requirement of cooling hot spots. In this situation, the flow that is used for powertrain cooling purposes can be freed up and redirected downwards to capture the effects of the virtual airdam. In this case, the additional cost to come up with the source and power for creating a jet is absent. So, this invention is also appropriate for fuel cell vehicles.

Thus, the invention also has potential applications in fuel cell vehicles. Such advanced vehicles breathe much more than conventional vehicles. This is primarily obtained by sizing the fan package of the airdam of this invention at different locations. By fine tuning the locations at which the flow is ejected, some potential drag savings can also be obtained.

This invention is also a virtual airdam assembly for use on the underside of a vehicle's front engine compartment. The assembly includes a conduit configured to connect to the vehicle and has an inlet to receive either ram air or blower-supplied air and an outlet configured to supply the received air as jets forming a virtual airdam.

This invention is also a method of reducing drag and increasing volumetric airflow for cooling in a moving vehicle's engine compartment positioned above a vehicle support. The invention comprises forming an air conduit with respect to the engine compartment, porting said conduit to form a jet-forming outlet positioned to direct the jet away from said compartment and toward said vehicle support, and supplying air through said conduit in a sufficient volume to said jet-forming outlet to form a virtual airdam at least partially between said engine compartment and said vehicle support which sufficiently intercepts an air stream created by the moving vehicle to reduce vehicle drag.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
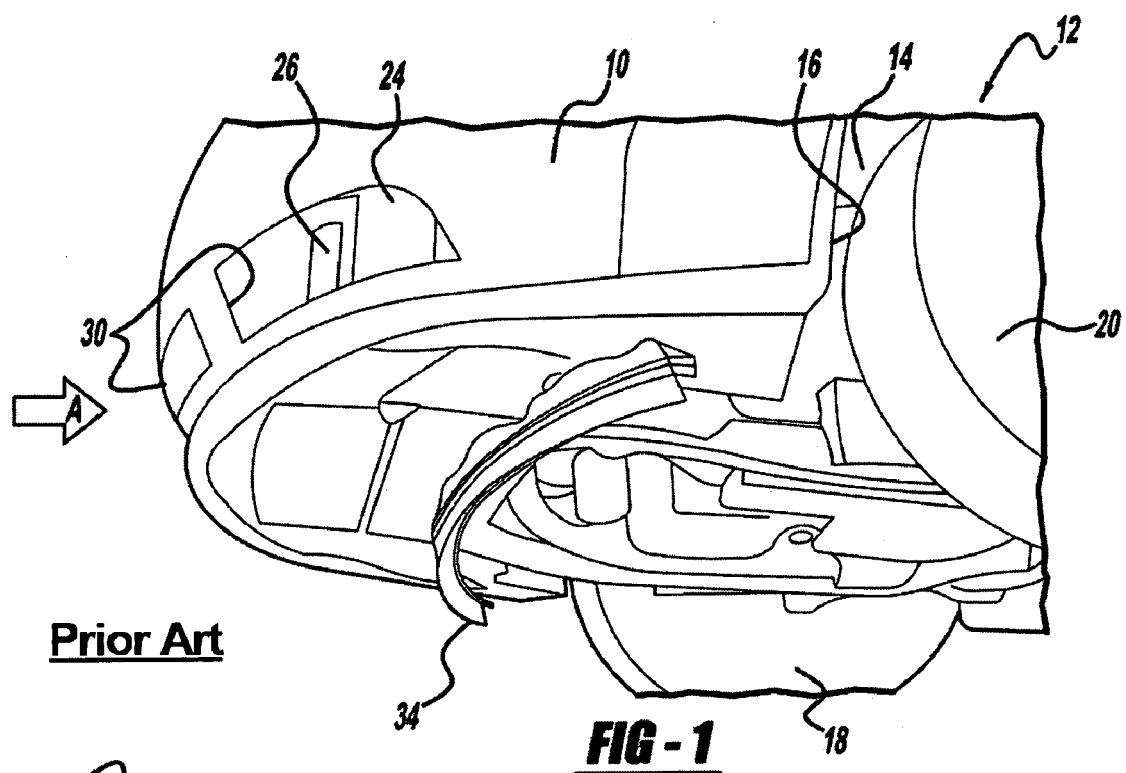
FIG. 1 is a fragmentary underside perspective of a conventional airdam on the front of a vehicle.
Figure 2:
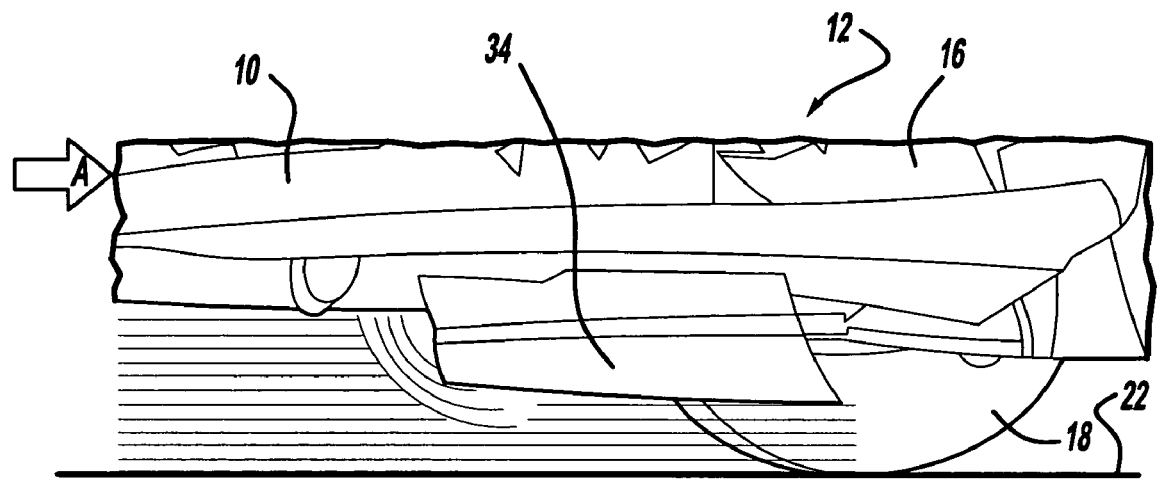
FIG. 2 is a schematic CFD simulation in sideview of the diversion of air flow by the conventional airdam.

FIG. 1 shows the front end 10 of a vehicle 12. The vehicle has an internal combustion (IC) engine 14 in an engine compartment 16 for driving wheels 18, 20 on a roadway or support surface 22. The engine 14 has a radiator 24 in a coolant circuit with the engine. The radiator has a fan 26 for circulating forced air through the radiator. An air scoop or grille 30 is formed in the front end of the vehicle so that cooling air flow A (RAM AIR) is created by the forward movement of the vehicle. The cooling air flow A circulates through and around the radiator 24 in the front of the vehicle and continues through the engine compartment 16 to cool some other hot spots in the underhood environment of the vehicle such as an air conditioning condenser. An airdam 34 is formed generally as a curved band of plastic beneath the front end of the vehicle. The airdam 34 diverts air as shown in FIG. 2 and decreases the pressure in the engine compartment. This pressure differential increases the RAM flow A through the air scoop 30 or the grille in the front end of the vehicle.

Figure 3:
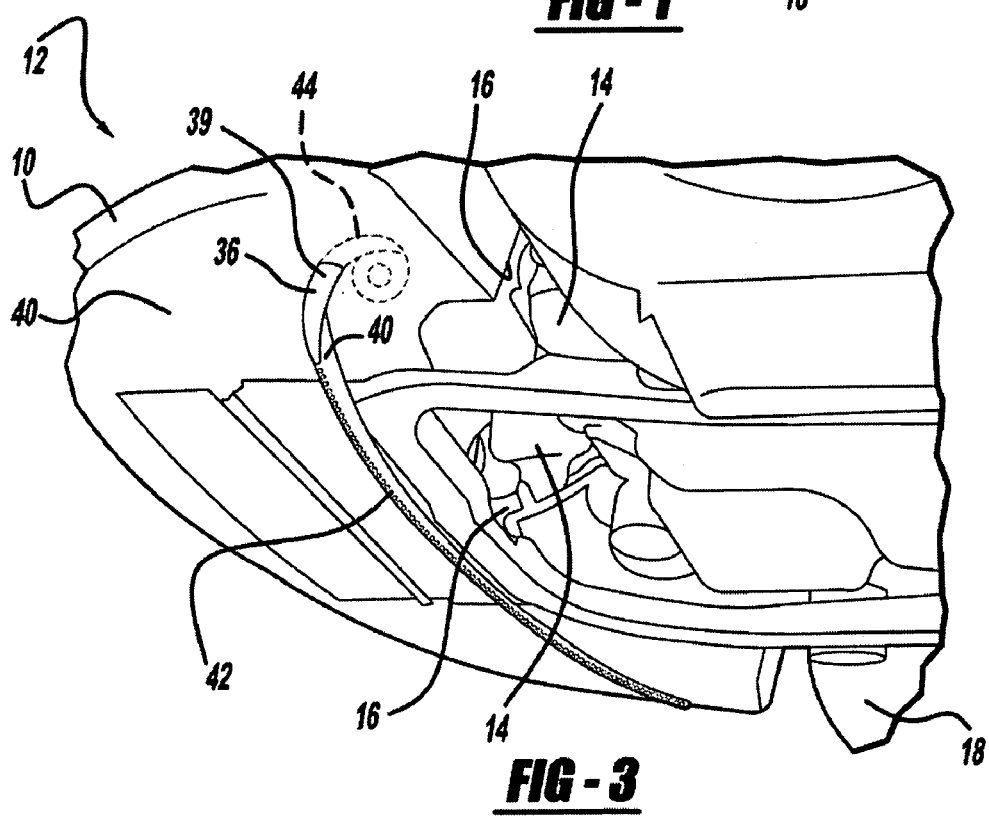
FIG. 3 is a fragmentary underside perspective of the virtual airdam jet configuration of this invention.
Figure 4:
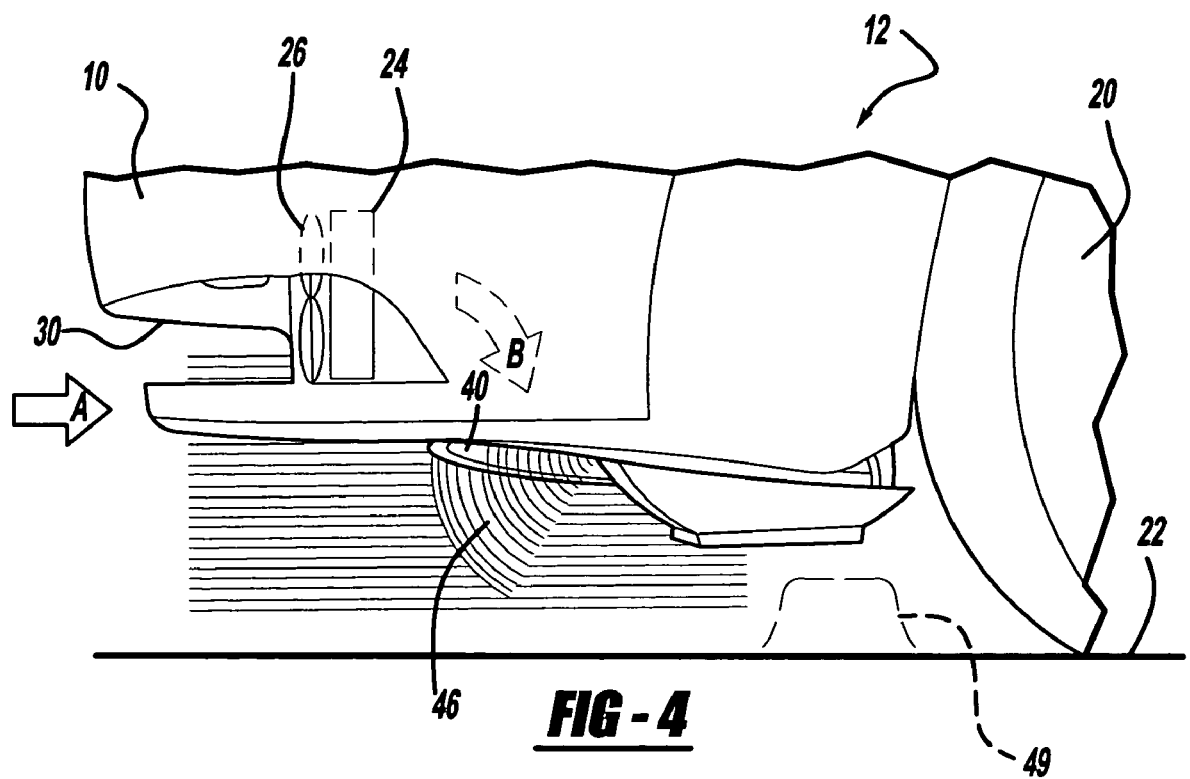
FIG. 4 is a schematic CFD simulation in sideview of the air flow for the virtual airdam.

The virtual airdam of this invention is shown in FIGS. 3 and 4. The plastic band of the conventional air dam is replaced by a hollow similarly configured air conduit 40. The air conduit 40 has a series of ports or orifices 42 distributed along the length of the conduit. Air is forced into the conduit 40 by a fan or blower 44. As shown in FIG. 3, the blower 44 forces air into an end 39 of the conduit and the air is distributed through the holes 42 in the conduit to form an air curtain which acts as a virtual airdam. The size and shape of the ports are designed to produce a jet of air in the desired direction downward toward a roadway or support surface 22 at the desired velocity when a predetermined volume (CMM) of air is supplied to the conduit. A slot or slit of about 1 cm width along the length of the conduit may substitute for the series of ports in the air conduit 40. The goal is to reduce the drag on a moving vehicle and increase fuel economy. A secondary goal is to enhance cooling with air flow B in the engine compartment 16, see FIG. 4.

With reference to FIG. 4, the virtual airdam is formed by the air jets (or air curtain) 46 ejected from the air conduit 40 to cooperate with the inflow of cooling air A through the air scoop to aspirate and enhance air flow B from the engine compartment. The jets (or air curtain) of forced air 46 sufficiently intercept an air stream created by the moving vehicle to reduce vehicle drag, thus having the affect of a virtual airdam.

As further shown in FIG. 4, the conduit 40 is spaced sufficiently away from any normal road abutment, such as the curb 49, to avoid hitting the abutment during normal operation of the vehicle, such as parking.

Figure 5:
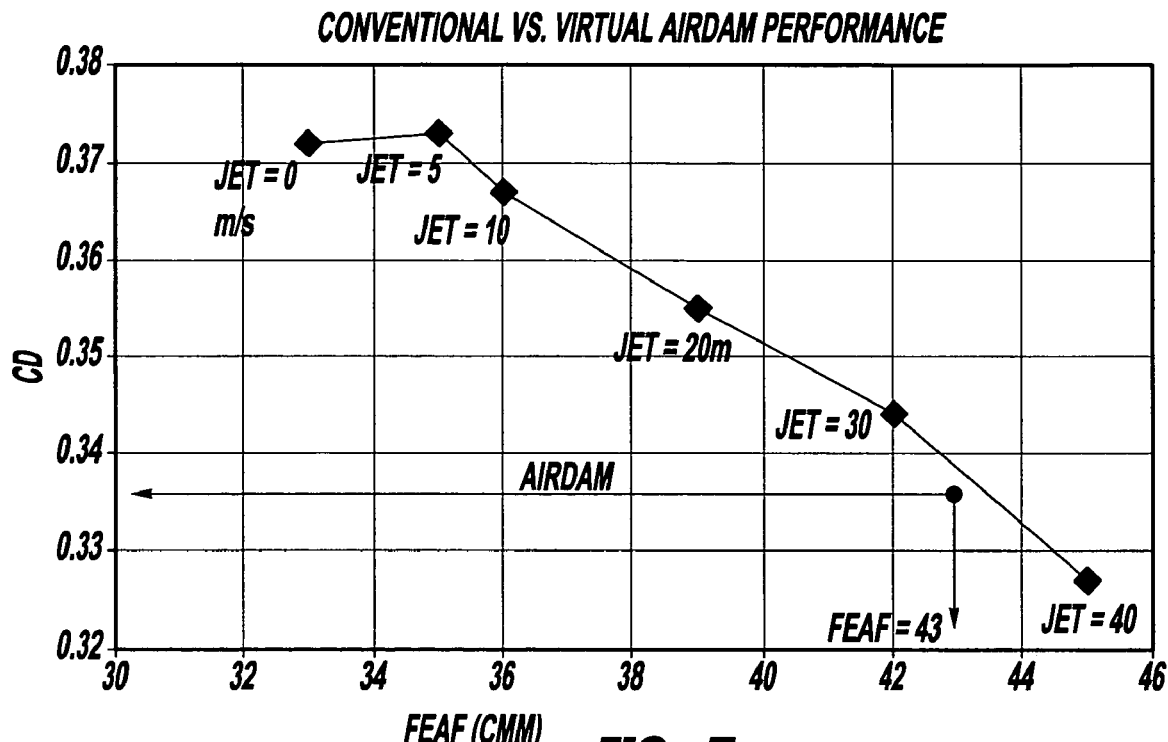
FIG. 5 is a chart showing the drag reduction of the virtual airdam (CD) as a function of front end airflow (FEAF) or velocity (CMM) for the conventional airdam versus the virtual airdam.

FIG. 5 shows conventional versus virtual airdam performance. The airdam increases cooling flow and reduces aerodynamic drag. FIG. 5 shows the amount of the drag reduction and its impact on the cooling flow. High drag reduction with no flow improvement is not an optimal design. The figure shows the performance of a conventional airdam compared with the corresponding virtual airdam. As shown in this figure, a virtual airdam performs similar to a conventional airdam in terms of reducing drag and optimizing the flow.

Figure 6:
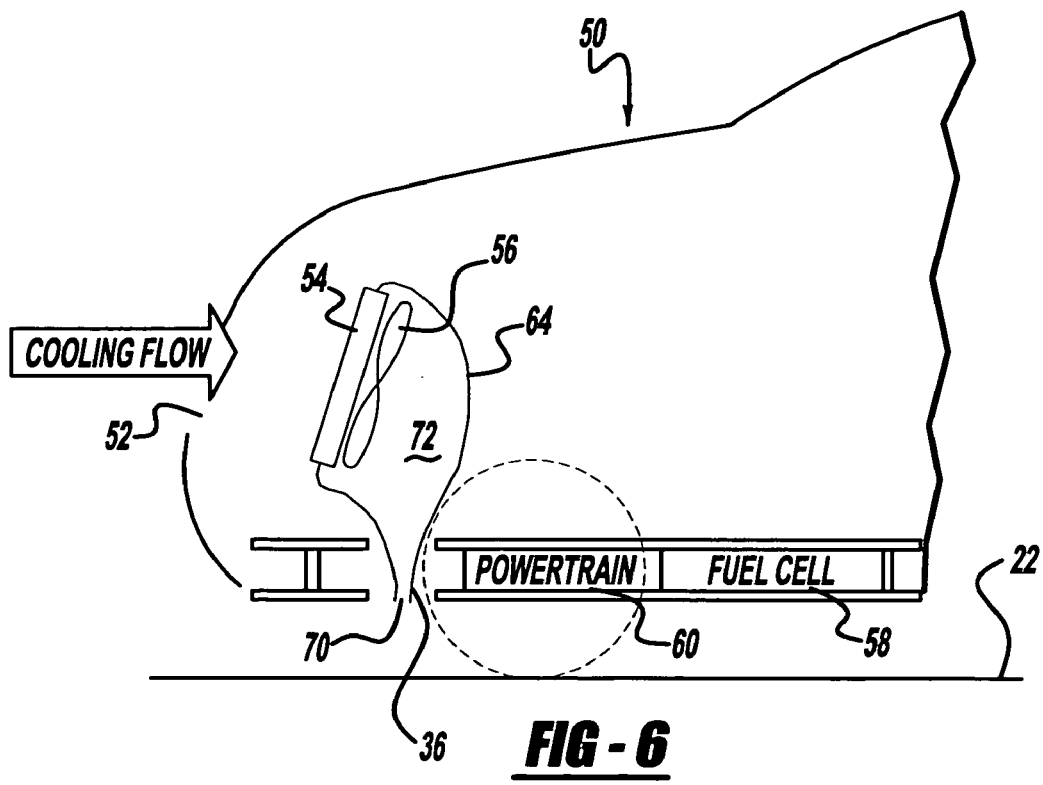
FIG. 6 is a schematic showing of a jet airdam in a fuel cell vehicle.

A fuel cell vehicle 50 is shown in FIG. 6. Vehicle 50 has a cooling air inlet 52 for receiving ram air when the vehicle is moving. The radiator 54 has a fan 56. The radiator is in a heat exchange relationship with the fuel cell stack 58. The fuel cell stack is the energy source for the powertrain 60 of the fuel cell vehicle 50. A shroud 64 is in air flow communication with the radiator 54 and terminates in a jet-forming outlet slot or slit 70 configured to form a virtual airdam 36 as described hereinbefore. The fan 56 may be used to redirect air with an air conduit 72 formed by the shroud 64. Fuel cell vehicles have much higher cooling airflow requirements (almost three times the IC engines). Cooling flow in such IC vehicles is used for engine cooling and also later used to cool some hot spots in the underhood environment. However, fuel cell vehicles as exemplified here do not have the requirement of cooling hot spots other than the fuel cell stack. Thus, in this example, fuel cell vehicles free up air flow that would otherwise be used for powertrain cooling purposes so that the airflow may be redirected downwards in conduit 72 to capture the effects of the virtual airdam at a jet-forming outlet slot or slit 70, which may be configured as described hereinbefore for conduit 40. In the case of fuel cell vehicles, the additional cost to come up with the source and power for jet 70 is saved. So, the virtual airdam of this invention has a technical advantage in fuel cell vehicles.

While the best modes for carrying out the invention have been described in detail, those familiar with the art to which this invention relates will recognize various alternative designs and embodiments for practicing the invention within the scope of the appended claims.

The invention claimed is:

1. A vehicle having a forward end including a conduit spaced from a support surface for the vehicle, said conduit having a source of air under pressure and is spaced sufficiently from any normal abutment on said support surface to avoid said abutment and including an outlet extending transversely substantially across the forward end of the vehicle and operable to project a curtain of air from said forward end toward said support surface with sufficient flow and direction to form a virtual airdam sufficiently to reduce vehicle drag.

2. The vehicle of claim 1 including a series of ports in the conduit at said outlet for projecting the curtain of air.

3. The vehicle of claim 1 including a slit in the conduit at said outlet for projecting the curtain of air.

4. The vehicle of claim 1 wherein the source of air is a fan or blower.

5. The vehicle of claim 1 wherein the operation of the source of air is adjustable.

6. The vehicle of claim 1 including a fuel cell and a radiator in an air flow communication with said source of air under pressure, and a shroud connected to said source of air and configured to form the conduit.

7. A vehicle having a forward end enclosing an engine needing cooling air flow and including a conduit spaced from a support surface for the vehicle, said conduit including an outlet extending transversely substantially across the forward end of the vehicle and having a source of air pressure and spaced sufficiently from any normal abutment on said support surface to avoid said abutment and operable at said outlet to project a curtain of air from said forward end toward said support surface with sufficient flow and direction to form a virtual airdam sufficiently to reduce vehicle drag while maintaining said cooling air flow for said engine.

8. The vehicle of claim 7 including a series of ports in the conduit at said outlet for projecting the curtain of air.

9. The vehicle of claim 7 including a slit in the conduit at said outlet for projecting the curtain of air.

10. The vehicle of claim 7, wherein the source of air is a fan or blower.

11. The vehicle of claim 10 including a radiator in air flow communication with said fan or blower.

12. A method of reducing drag and increasing volumetric airflow for cooling in a moving vehicle's engine compartment positioned above a vehicle support comprising:

forming an air conduit substantially across the forward end of said vehicle to form a jet-forming outlet substantially across the forward end of said vehicle and positioned to direct the air in a downward direction away from said compartment and toward said vehicle support; and supplying sufficient air through said jet-forming outlet to form a virtual airdam at least partially between said engine compartment and said vehicle support which sufficiently intercepts an air stream created by the moving vehicle to reduce vehicle drag.

13. A virtual airdam assembly for a movable support on a roadway and comprising an elongated conduit configured to be supportable on the underside of a front end portion of the movable support, said conduit configured to extend transversely across said front end portion and having an inlet opening configured for receiving air and an outlet opening configured to extend transversely substantially across said front end to project a jet of air in a downward direction toward said roadway, thereby to form a virtual airdam with the air received to reduce drag on the movable support.

14. The virtual airdam assembly of claim 13 wherein the movable support is a vehicle front engine compartment adapted to receive ram air and the outlet opening of the conduit is configured to project a curtain of air away from the engine compartment with sufficient flow at least partially due to said ram air when said assembly is moving, thereby to increase volumetric air flow for cooling in said engine compartment.

15. The virtual airdam assembly of claim 13 including a blower for supplying at least a portion of the air received by said inlet opening of said conduit.

* * * * *